US012642382B2

(12) United States Patent
Frey

(10) Patent No.: US 12,642,382 B2
(45) Date of Patent: Jun. 2, 2026

(54) COOKING DEVICE

(71) Applicant: V-ZUG AG, Zug (CH)

(72) Inventor: Ulrich Frey, Obfelden (CH)

(73) Assignee: V-ZUG AG, Zug (CH)

( * ) Notice: Subject to any disclaimer, the term of this patent is extended or adjusted under 35 U.S.C. 154(b) by 647 days.

(21) Appl. No.: 17/916,901

(22) PCT Filed: Apr. 16, 2020

(86) PCT No.: PCT/EP2020/060694
§ 371 (c)(1),
(2) Date: Oct. 4, 2022

(87) PCT Pub. No.: WO2021/209135
PCT Pub. Date: Oct. 21, 2021

(65) Prior Publication Data
US 2023/0148781 A1    May 18, 2023

(51) Int. Cl.
*A47J 27/04* (2006.01)
*F24C 7/06* (2006.01)
(Continued)

(52) U.S. Cl.
CPC .............. *A47J 27/04* (2013.01); *F24C 7/065* (2013.01); *F24C 7/067* (2013.01); *F24C 7/088* (2013.01);
(Continued)

(58) Field of Classification Search
CPC ..... A47J 27/04; A47J 2027/043; F24C 7/065; F24C 7/067; F24C 7/088; F24C 15/327; F24C 7/087; F24C 15/325
(Continued)

(56) References Cited

U.S. PATENT DOCUMENTS

| | | | | |
|---|---|---|---|---|
| 7,985,944 B2 * | 7/2011 | Willett | ..................... | A21B 3/04 219/403 |
| 2006/0137675 A1 * | 6/2006 | Kim | ...................... | F24C 15/325 126/21 A |

(Continued)

FOREIGN PATENT DOCUMENTS

| | | | | | |
|---|---|---|---|---|---|
| CN | 202436901 U | * | 9/2012 | .............. | A47J 27/04 |
| EP | 1624255 A1 | * | 2/2006 | .......... | F24C 15/2007 |

(Continued)

OTHER PUBLICATIONS

Chinese to English machine translation of CN202436901U.*

(Continued)

*Primary Examiner* — Michael G Hoang
*Assistant Examiner* — Elizabeth Ann Laughlin
(74) *Attorney, Agent, or Firm* — McCormick, Paulding & Huber PLLC

(57) ABSTRACT

A cooking device, in particular a steam oven, includes a cooking cavity and a heating unit. The heating unit has a first and a second heating element capable to operate at different temperatures, and at least one fan. The cooking device is configured in such a manner that the fan collects air from the cooking cavity and conveys a first airflow towards the first heating element and a second airflow towards the second heating element. The first airflow passing the first heating element creates a first airflow circuit in the cooking cavity, and the second airflow passing the second heating element creates a second airflow circuit in the cooking cavity. The two airflows can have different temperatures by individually controlling the power of the two heating element.

20 Claims, 5 Drawing Sheets

(51) Int. Cl.
    *F24C 7/08*         (2006.01)
    *F24C 15/32*       (2006.01)

(52) U.S. Cl.
    CPC ....... *F24C 15/327* (2013.01); *A47J 2027/043*
                                     (2013.01)

(58) Field of Classification Search
    USPC ......................................................... 126/369
    See application file for complete search history.

(56)                References Cited

U.S. PATENT DOCUMENTS

| | | | |
|---|---|---|---|
| 2010/0006085 A1* | 1/2010 | Thomas ................ | F24C 15/325 |
| | | | 165/104.34 |
| 2010/0147825 A1* | 6/2010 | Bonuso ................. | F24C 15/325 |
| | | | 219/400 |
| 2018/0259194 A1* | 9/2018 | Won ........................ | F24C 7/087 |
| 2020/0096202 A1* | 3/2020 | Guida ................ | G05D 23/1951 |

FOREIGN PATENT DOCUMENTS

| | | | | |
|---|---|---|---|---|
| EP | 2 153 723 A2 | 2/2010 | | |
| EP | 2 336 650 A2 | 12/2010 | | |
| EP | 3 273 167 A1 | 1/2018 | | |
| WO | WO-2008047397 A2 * | 4/2008 | ............ | F24C 15/325 |
| WO | 2019/068193 A1 | 4/2019 | | |

OTHER PUBLICATIONS

International Search Report mailed on Dec. 9, 2020, in connection with corresponding International Application No. PCT/EP2020/060694; 4 pages.

* cited by examiner

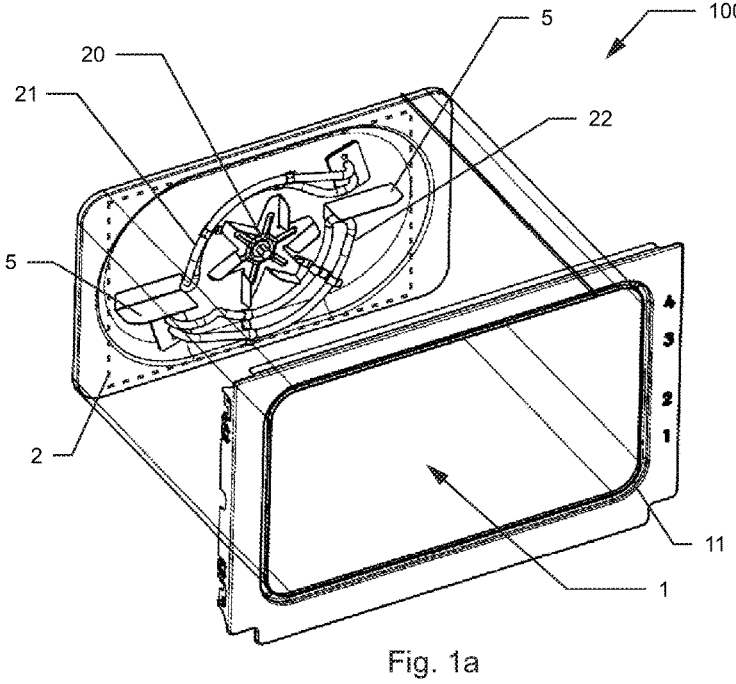
Fig. 1a
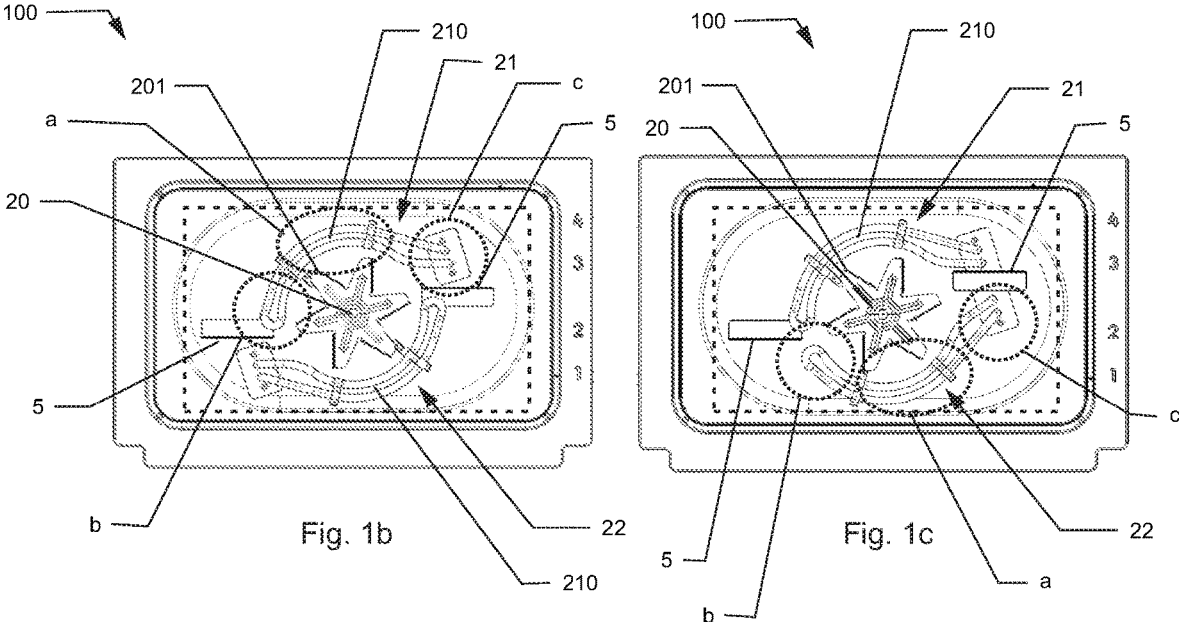
Fig. 1b
Fig. 1c

COOKING DEVICE

CROSS-REFERENCE TO RELATED APPLICATION

This application is a National Stage application of International Patent Application No. PCT/EP2020/060694, filed on Apr. 16, 2020, which is hereby incorporated by reference in its entirety.

TECHNICAL FIELD

The present invention relates to a cooking device, in particular a steam oven, and a method for operating the cooking device.

BACKGROUND

The air within the cooking cavity of a cooking device, in particular a steam oven, is heated by means of heating elements. Typically, the cooking device comprises one or more fans, wherein each fan is enclosed by a ring heater to heat the air that is circulated by the fan. The heating elements and the fans are arranged in a heating cavity, e.g. at the back side of the cooking cavity.

The heat distribution in the cooking cavity of such a cooking device is more or less homogeneous.

SUMMARY

The problem to be solved by the present invention is therefore to provide a cooking device that creates different temperatures within the cooking cavity of a cooking device.

This problem is solved by the cooking device of claim 1.

Hence, in a first aspect, the invention relates to a cooking device, in particular a steam oven, comprising at least the following elements:

A cooking cavity: This is the cavity used for cooking the foodstuff.

A heating cavity: This is a cavity separate from the cooking cavity. It contains the heating unit as outlined below.

A wall arranged between the cooking cavity and the heating cavity: This wall mechanically separates the two cavities. Advantageously, the wall extends substantially vertically.

Ventilation openings arranged between the cooking cavity and the heating cavity to provide for an air exchange between the two cavities.

A heating unit: This heating unit is arranged in the heating cavity. It comprises a first and a second heating element and a fan. The fan is positioned and adapted to collect air from the cooking cavity and to convey the air, in two separate airflows, to interact with the first and second heating elements. (In this context, 'interact' is to be understood as the airflow entering into a heat exchange with the given heating element.) More specifically, the fan is positioned and adapted:

a) to generate a first airflow interacting with the first heating element and being conveyed back into a first part of the cooking cavity and b) to generate a second airflow interacting with the second heating element and being conveyed back into a second part of the cooking cavity.

A control unit: This control unit is adapted and structured to operate the first and second heating elements independently from each other, i.e. it can vary the average heating powers and/or temperatures of the two heating elements differently. For example, it may increase the power of one heating element while keeping the power of the other heating element constant or decreasing it, or vice versa.

This allows to feed two differently heated airflows back into the cooking cavity, which may e.g. be used to heat the foodstuff from two different sides, in particular from above and below.

For example, the first heating element may be operating while the second heating element is turned off, or vice versa. Both heating elements may advantageously be controlled independently of the fan.

Advantageously, the control unit may be adapted to operate the first and second heating elements at different average surface temperatures. In this context, "average" relates to an average over a time larger than the typical on-off-cycle of the heating elements when the average heating power is controlled by means of switching the heating elements on and off. In particular, 'average' refers to an average over a time period dt with dt being a value between 1 and 10 minutes, in particular between 2 and 6 minutes.

The first airflow passing the first heating element creates a first airflow circuit in the heating cavity and the cooking cavity and the second airflow passing the second heating element creates a second airflow circuit in the heating cavity and in the cooking cavity.

Due to the different controllability of the first and the second heating element, the first and the second airflow can be heated to different temperatures as they enter the cooking cavity. Therefore, the first and second parts of the cooking cavity can be maintained at different temperatures. Such different temperatures within the cooking cavity enable the optimization of various heating processes, e.g. for evaporating residual water that aggregates on the floor of the cooking cavity by adjusting the airflow such that it only heats up the floor section of the cooking cavity. A further example would be that, by adjusting the heating power of the respective airflow, the cooking device would apply a grilling function to the foodstuff within the cooking cavity.

In another advantageous embodiment, the first heating element is arranged above the fan and the second heating element is arranged below the fan. Advantageously, the second heating element below the fan might be heated to a higher temperature than the first heating element above the fan.

In another advantageous embodiment, the heating unit further comprises a second fan. In a mode of operation of the cooking device, the second fan collects air from the cooking cavity and conveys it towards the first and the second heating element.

In other advantageous embodiments, the heating unit may further comprise at least one second fan that collects air from the cooking cavity and conveys it toward the first and the second heating element.

In another advantageous embodiment, the heating unit comprises a first and a second subsection in the heating cavity. The first subsection comprises the first and the second heating element as well as the first fan. The second subsection comprises a third and a fourth heating element individually operatable at different temperatures and a second fan. In a mode of operation, the second fan collects air from the cooking cavity and conveys a third airflow towards the third heating element and a fourth airflow towards the fourth heating element. The third airflow is passed by into the first part of the cooking cavity, and the fourth airflow is passed back into the second part of the cooking cavity.

Advantageously, the control unit may be adapted to operate the third and fourth heating elements at different average surface temperatures.

In other embodiments, the cooking device may further comprise further subunits, each having further heating elements and a further fan.

In an advantageous embodiment, the control unit is adapted to control each heating element, e.g. the first, second, third and fourth heating element, independently from the first and/or second fan. Also, each of said heating elements might be controlled independently from the other heating elements.

In a further mode operation of the cooking device, the control unit may be adapted to control the first fan and the second fan individually. Therefore, only the first fan might be running and the second fan might be turned off or vice versa.

The rotation direction and/or the rotation speed of the first fan may be the same as or different from the rotation direction and/or rotation speed of the second fan. In particular, the control unit may be adapted to rotate the first and second fans with different speeds and/or with different directions.

Advantageously, in the intended operation of the cooking device, the rotation direction of the first fan is opposite to the rotation direction of the second fan. In other words, the control unit and/or fan drivers of the device is/are adapted to rotate the first and second fans in opposite directions.

Furthermore, an advantageous fan may comprise blades that extend from the rotation axis of the fan in a radial direction and end in blade tips. In operation, the tips of the blades rotate around the rotation axis. They form a substantially virtual rotation circle around the respective rotation axis.

In an advantageous embodiment, the rotation of the respective fan is adapted to convey the respective airflow to a specific sector of the cooking device.

Regarding the shape of the heating elements of the cooking device, in a further advantageous embodiment, at least one of the heating elements, in particular all of the heating elements, may comprise at least one curved portion that extends essentially along a sector section of the rotation circle described by the tips of the blades of the first fan. Advantageously, such a curved portion extends along a sector section of above 60°, very advantageously along a sector section of above 120°.

If the embodiment comprises a second fan, at least one of the heating elements may each further comprise at least a second curved portion that extends essentially along a second sector section of a rotation circle described by the tips of the blades of the second fan. In addition, the second curved portion advantageously extends along a sector section of above 60°, very advantageously along a sector section of above 120°.

In a further advantageous embodiment, the first and second curved portion may extend along sector sections with the same angle.

In another advantageous embodiment, the first sector section and the second sector section extend along different angles, advantageously wherein the angles differ by at 30°, in particular by at least 60°.

In an advantageous embodiment comprising a second subsection of the heating unit, the third and/or fourth heating element each can comprise at least one curved portion that extends essentially along a sector section of a rotation circle described by tips of blades of the second fan. Advantageously, the at least one curved portion of the third and/or fourth heating element extends along a sector section of above 60°, very advantageously along a sector section of above 120°.

Advantageously, the first, second, third and/or fourth heating element has the shape of a folded heating rod. Advantageously, such a folded heating element may be sectioned into three sections:

A parallel section refers to a segment of the rod where a first and a second section of the folded rod are arranged essentially in parallel to each other.

A bent folding section connecting the first and the second section.

A connector section forming the beginning and the end of the rod. Advantageously, for easier mounting, the beginning and the end of the rod are close to each other, in particular closer than 10 cm.

Advantageously, the connector sections of the heating elements are connected to separate power drivers individually controllable be the control unit.

In a further advantageous embodiment, the first, second third and/or fourth heating element is arranged such that an end of the respective folding section or the connector section of the respective heating element forms an angle α relatively to a horizontal axis, wherein $\alpha \geq 60°$.

The device may further comprise at least one deflector element arranged in the heating cavity. It is arranged between two of the heating elements and extends transversally to a tangential direction of the fan. In this context, a "tangential direction of the fan" is a direction that is tangential to a circle concentric to the fan's axis. Such a deflector elements obstructs air moving along the tangential direction from one heating element to the other, thereby reducing the heat exchange between the two heating elements.

In this case, at least one such deflector element might be arranged:

between the connector section of the first heating element and the connector section of the second heating element, and/or between the connector section of the first heating element and the folding section of the second heating element, and/or between the folding section of the first heating element and the folding section of the second heating element.

If the device has third and fourth heating elements as mentioned, above, at least one such deflector element might also be arranged between the connector section of the third heating element and the connector section of the fourth heating element, and/or between the connector section of the third heating element and the folding section of the fourth heating element, and/or between the folding section of the third heating element and the folding section of the fourth heating element.

In particular, multiple deflector elements can be arranged at different locations of the heating cavity.

Advantageously, the cooking device comprises at least two deflector elements arranged in two of the above-mentioned arrangements, wherein every combination of arrangements may be possible.

The at least one deflector element may comprise a plate, in particular of metal, that is mounted between the respective heating elements.

In another advantageous embodiment, the curved section of the parallel section of the first heating element and a curved section of the parallel section of the second heating element form the smallest gap between the parallel section of the first heating element and the parallel section of the second heating element. This smallest gap is located between the first fan and the second fan. Advantageously, the curved section of the lower heating element is formed such that it crosses a plane defined by the rotation axes of the first fan and the second fan.

In at least one mode of operation of the device, the control unit may be adapted to maintain the temperature difference between the first airflow and the second airflow, as the airflows exit the heating cavity, at at least 20° C., in particular at at least 50° C., very particular at at least 100° C. This allows to maintain a substantial temperature gradient in the heating cavity.

The term airflow itself preferably refers to a respective volume of air that is circulating within the cooking cavity and the heating cavity, wherein the respective volume of air is heated by the respective heating element.

An advantageous embodiment of the present invention refers to a cooking device that is operated as a steam oven. In that case, the device comprises a steam generator, and the control unit is adapted to maintain a (relative) air humidity in the cooking cavity at at least 40%. In such an embodiment, all parts and processes are advantageously designed to be used in a highly humid environment. In particular, the fan, the first and second heating element, as well as any deflector, if present, may be of materials resistant against humidity, e.g. at least some of these parts may be formed (at least at their surfaces) from stainless steel.

In a further aspect, the ventilation openings comprise at least one entry opening at least a first exit opening and at least a second exit opening for leading are from the cooking cavity into the heating cavity and from the heating cavity into the cooking cavity, respectively.

The first fan may then be adapted:

To convey air from the cooking cavity into the heating cavity through said entry opening.

To convey the first airflow from the heating cavity back into the cooking cavity through the first exit opening and to convey said second airflow from the heating cavity into the cooking cavity through the second exit opening.

Advantageously, the first exit opening(s) is/are located above the second exit opening(s), and/or the entry openings may be vertically located between the first and second exit openings.

A second aspect of the present invention refers to a method for operating such a device. The method comprises the step of operating the heating elements at different surface temperatures such that the first and second airflows have different temperatures when entering the cooking cavity from the heating cavity.

Advantageously, the heating elements are operated such that the temperature difference between the average surface temperatures of the first and second heating element is at least 20° C., in particular at least 50° C., very particular at least 100° C.

It is understood that the various embodiments, preferences, and method steps as disclosed in the specification may be combined at will, if not otherwise specified or explicitly excluded. Other advantageous embodiments are listed in the dependent claims as well as in the description below.

6

BRIEF DESCRIPTION OF THE DRAWINGS

The invention will be better understood and objects other than those set forth above will become apparent from the following detailed description thereof. Such description refers to the annexed drawings, wherein:

FIG. 1a shows a perspective view of a cooking device according to a first embodiment of the present invention;

FIG. 1b shows a front view of the cooking device of FIG. 1a;

FIG. 1c shows a further embodiment according to the invention;

Figure 1D:
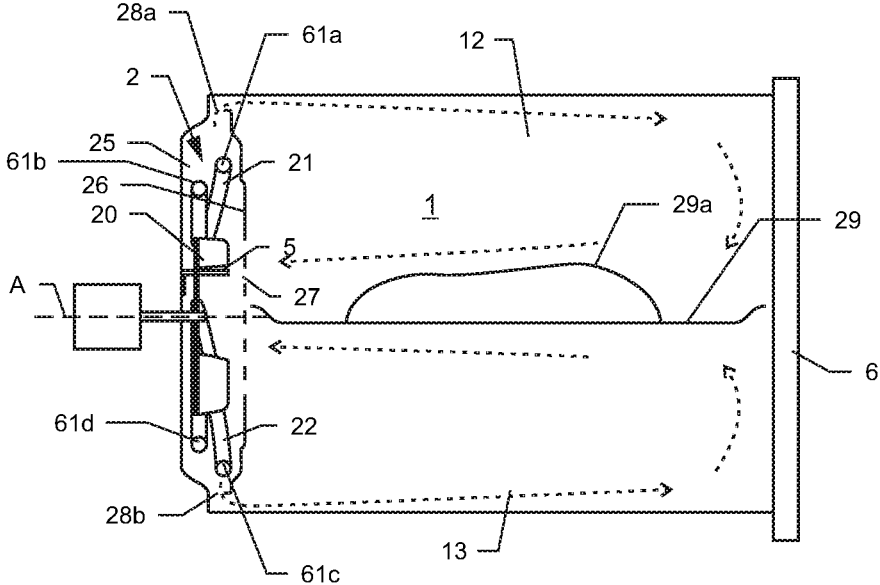
FIG. 1d shows a schematic sectional view along a vertical plane intersecting with the axis of the fan.

Note: The wall separating the cooking cavity and the heating cavity is only shown in FIGS. 1d and 1e.

DETAILED DESCRIPTION

FIG. 1a shows a schematic perspective view of a first embodiment of cooking device 100. It comprises a cooking cavity 1 and a heating unit 2. The heating unit 2 comprises a first 21 and a second 22 heating element capable to operate at different average surface temperatures and a fan 20.

As shown in FIG. 1d, the heating unit 2 is arranged in a heating cavity 25. A wall 26 is arranged between the cooking cavity 1 and the heating cavity 25.

In the shown embodiments, wall 26 extends vertically and forms a backside wall of the cooking cavity 1, located opposite a user-facing opening 11 of the cooking cavity 1.

Entry openings 27 as well as exit openings 28a, 28b are located between in wall 26 between the cooking cavity 1 and the heating cavity 25. They form ventilation openings that allow the air to circulate between the two cavities 1 and 25.

The cooking device 100 is configured in such a manner that, in the intended operation, the fan 20 collects air from the cooking cavity 1 and conveys a first airflow towards the first heating element 21 and a second airflow towards the second heating element 22. The first airflow passing the first heating element 21 is conveyed back into a first part 12 of the cooking cavity 1. The second airflow passes the second heating element 22 and is conveyed back into a second part 13 of the heating cavity.

The air enters the heating cavity 25 through the entry openings 27. The first airflow leaves it through first exit opening 28a, and the second airflow leaves it through second exit opening 28b.

Advantageously, the first exit opening 28a is located in the upper half, in particular in the uppermost fourth, of the cooking cavity 1 while the second exit opening 28b is arranged in the lower half, in particular in the lowermost fourth, of the cooking cavity, which allows to generate a vertical temperature gradient in the cooking cavity 1 between its first part 12 and its second part 13.

By arranging the exit openings 28a, 28b close to the top and bottom of cooking cavity 1, the air tends to flow all the way to the user door 4 of cooking cavity 1, where it is deflected and then returns along the top and bottom of the food to be prepared, which provides a more homogeneous temperature distribution along the depth (i.e. the direction perpendicular to user door 6) of cooking cavity 1.

As illustrated in FIG. 1d, the temperature difference between first part 12 and second part 13 becomes even more pronounced in the presence of a cooking tray 29 for the foodstuff 29a arranged between them.

Advantageously, fan 20 is a radial fan sucking in air along an axial direction and expulsing it radially, which allows to keep the heating cavity 25 small in axial direction of the fan 20.

FIG. 1b shows a front view of the cooking device of FIG. 1a with the details of the cooking device 100 and in particular of the heating unit 2.

The fan 20 comprises blades that extend, from a rotational axis A of the fan 20 (cf. FIG. 1d), along radial direction and end in tips 201 of the fan 20.

The first 21 and the second 22 heating element each has the shape of a folded heating rod. Each respective folded rod has a parallel section "a" where a first section of the rod is formed essentially in parallel to a second section of the rod. In addition, each respective folded rod has a folding section "b", which refers to the bent portion of the rod between the first and the second section. Furthermore, a connector section "c" of each of the respective rods is referring to the two portions at the beginning and at the end of the rod, which are mounted close to each other. The connector section c of the first 21 and the second 22 heating elements are controllable independently from each other.

The first 21 as well as the second 22 heating element both comprise a curved portion 210. The curved portion 210 of each heating element 21, 22 extends within the parallel section of each respective rod. The curved portion 210 extends essentially along a sector section of a rotation circle described by the tips 201 of blades of the fan 20 of the heating unit 2. The heating elements 21, 22 each extend essentially along a sector section of above 60°.

A first deflector element 5 is arranged between the folding section b of the first heating element 21 and the connector section c of the second heating element 22. A second deflector element 5 is arranged between the connector section c of the first heating element 21 and the folding section b of the second heating element 22.

In an advantageous mode of operation of the cooking device, the temperature difference between the first airflow and the second airflow is at least 20° C., advantageously at least 50° C., very advantageously at least 100° C.

The cooking device 100 is advantageously a steam oven, wherein in the intended operation, the humidity of the air is at least 40%.

FIG. 1c shows a further embodiment. The embodiment is similar to the embodiment shown in FIG. 1b, except that in FIG. 1b the second heating element 22 and the first heating element 21 are arranged such that the folding section b of the first heating element 21 and the connector section c of the second heating element are arranged next to each other and the folding section b of the second heating element 22 and the connector section c of the first heating element are arranged next to each other. In FIG. 1c, in contrast, the folding sections b of the first 21 and the second 22 heating element are arranged next to each other and the respective connector elements c of the two heating elements 21, 22 are arranged next to each other.

FIG. 1d shows another advantageous design element of the present device that can be used in any of its embodiments. As can be seen, the heating elements 21, 22 are formed by pipes. At least in one plane extending through the axis A of rotation of fan 20, in particular in the vertical plane which corresponds to what is shown in FIG. 1d, the plane intersects, on each side of the axis A, at least two pipes. In the embodiment of FIG. 1d, two pipe intersections 61a, 61b are located above axis A and two pipe intersections 61c, 61d below axis A.

Figure 1E:
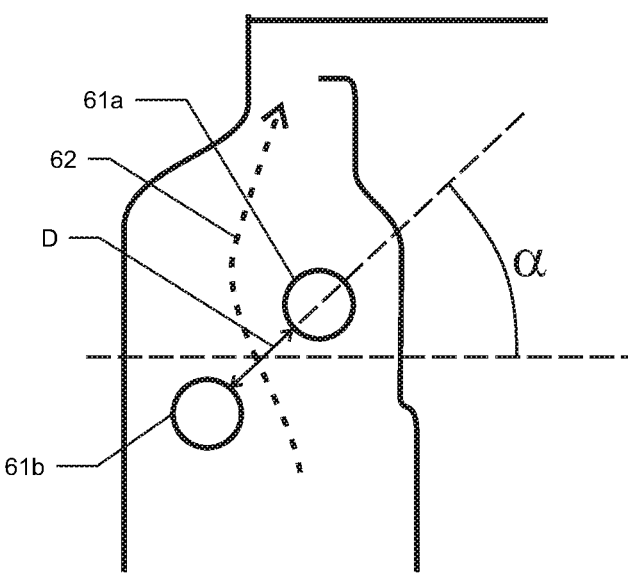
FIG. 1e shows a detail of FIG. 1d.

As can best be seen from FIG. 1e, in said plane, the two closest pipe intersections 61a, 61b are mutually offset along the axial as well as the radial direction of fan 20. This is in contrast to the classic design where the two pipe intersections 61a, 61b are both at the same radial distance from axis A, and it allows to maintain a larger shortest distance D (i.e. a larger gap) between the two pipes and reduces the resistance experienced by the radial airflow 62 from fan 20 as it passes the pipes.

As can be seen in FIG. 1e, the direction of the shortest distance D between the pipe intersections 61a, 61b and the direction of fan axis A (the horizontal direction in FIG. 1e) are arranged at a mutual an angle $\alpha$. Advantageously, this angle $\alpha$ is between 30 and 60°.

Hence, in more general terms, the heating elements 21, 22 are advantageously formed by pipes. In at least one plane extending through the axis A of rotation of fan 20, the closest pipe intersections 61a, 62b of the pipes with the plane have a direction of closest distance D that is under an angle $\alpha$ to the axis A of fan 20. The angle $\alpha$ is between 20° and 70°, in particular between 30° and 60°. If the angle is smaller than this range, the distance D decreases and the friction of the airflow increases. Also, the friction becomes very sensitive to any misalignment of the pipes, thereby tending to make the airflow inhomogeneous. If the angle is too large, the heating elements require too much space in radial direction or one pipe starts to shadow the other pipe, thereby affecting the heat transfer from the heating elements to the air.

Advantageously, this condition is fulfilled for the vertical plane extending through the axis A of fan 20.

In another advantageous embodiment, the above condition is fulfilled for a plurality of different planes, in particular for all planes within an azimuthal angular range of at least 45°. In this context, the azimuthal angle is the angle between two directions extending perpendicularly through axis A of fan 20.

Figure 2A:
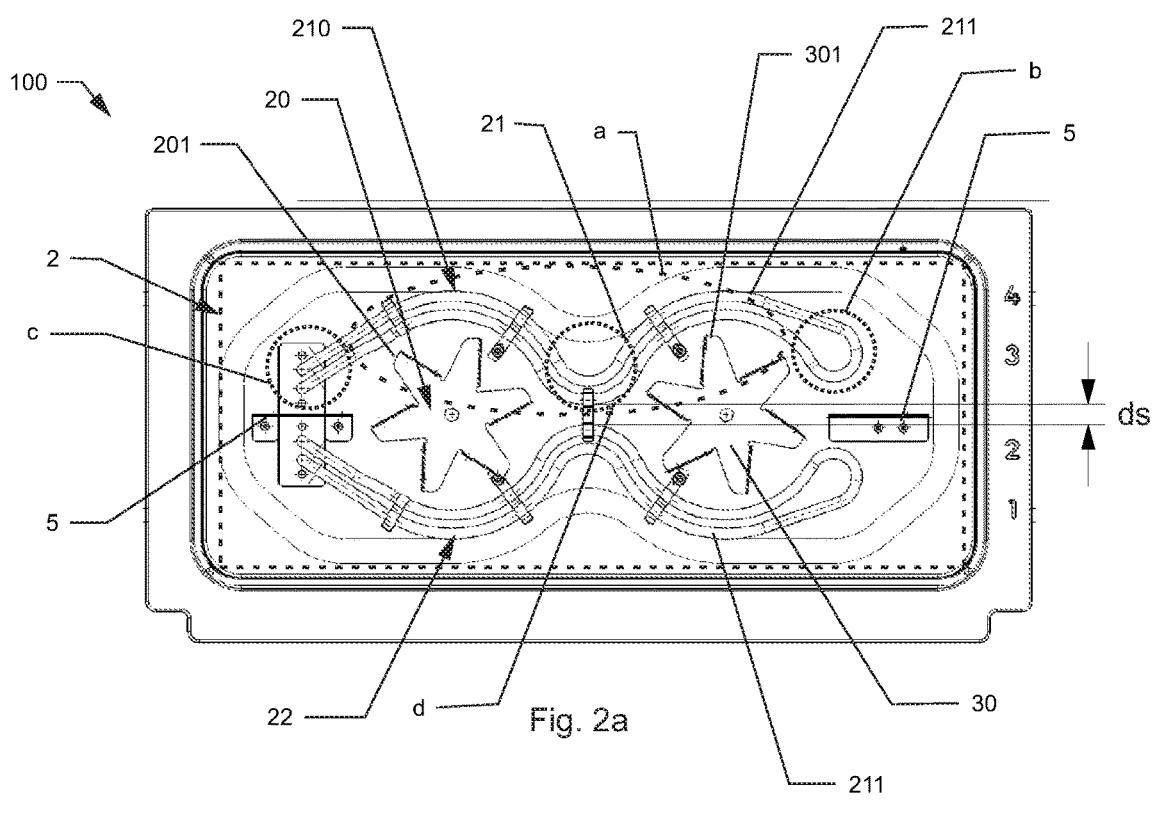
FIGS. 2a and 2b show each a front view of a cooking device according to two further embodiments.

FIG. 2a shows another advantageous embodiment where, in addition to the embodiment as shown in FIGS. 1a and 1b, the heating unit 2 of the cooking device 100 comprises a first fan 20 and a second fan 30. The cooking device 100 is configured in such a manner that, in the intended operation, the second fan 30 collects air from the cooking cavity 1 and conveys it towards the first 21 and the second 22 heating element.

In preferred operation of the cooking device 100, the rotation direction of the fan 20 is opposite to the rotation direction of the second fan 30, which improves the symmetry of the temperature distribution in the cooking cavity 1.

In another advantageous mode of operation of the cooking device 100, the rotation direction of the first fan 20 may be the same as the rotation direction of the second fan 30.

The first fan 20 and the second fan 30 each comprise blades that extend from the rotational axis A of the respective fan 20, 30 in radial direction and end in tips 201, 301 of the respective fan 20, 30.

The first 21 and the second 22 heating element again each have the shape of a folded heating rod. Each respective folded rod has a parallel section "a" where a first section of the rod is formed essentially in parallel to a second section of the rod. In addition, each respective folded rod has a folding section "b" which refers to the bent portion of the rod between the first and the second section. Furthermore, a connector section "c" of each of the respective rods is referring to the two portions at the beginning and at the end of the rod, which are mounted close to each other. The connector section c of the first 21 and the second 22 heating elements are controllable independently from each other.

The first 21 and the second 22 heating element each comprise a first curved portion 210 that extends essentially along a sector section of a rotation circle described by the tips 201 of blades of the first fan 20. The first 21 and the second 22 heating element further comprise each a second curved portion 211 that extends essentially along a second sector section of a second rotational circle described by tips 301 of blades of the second fan 30. The curved portion 201 of each of the heating elements 21, 22 may extend along a sector section of more than 120°. The second curved portion 211 of each of the heating elements 21, 22 may extend along a sector section of more than 120°.

A first deflector element 5 is arranged between the folding section b of the first heating element 21 and the folding section b of the second heating element 22. A second deflector element 5 is arranged between the connector section c of the first heating element 21 and the connector section b of the second heating element 22.

The parallel section "a" of the first heating element 21 between the folding section b and the connector section c has a curved section d, which is curved in a way to form the smallest gap ds to the parallel section a to the respective curved section d of the parallel section a of the second heating element 22.

In an intended operation of an advantageous cooking device, the temperature difference between the first airflow and the second airflow is at least 20° C., advantageously at least 50° C., very advantageously at least 100° C.

The cooking device 100 might advantageously be a steam oven, wherein in the intended operation, the humidity of the air is at least 40%.

Figure 2B:
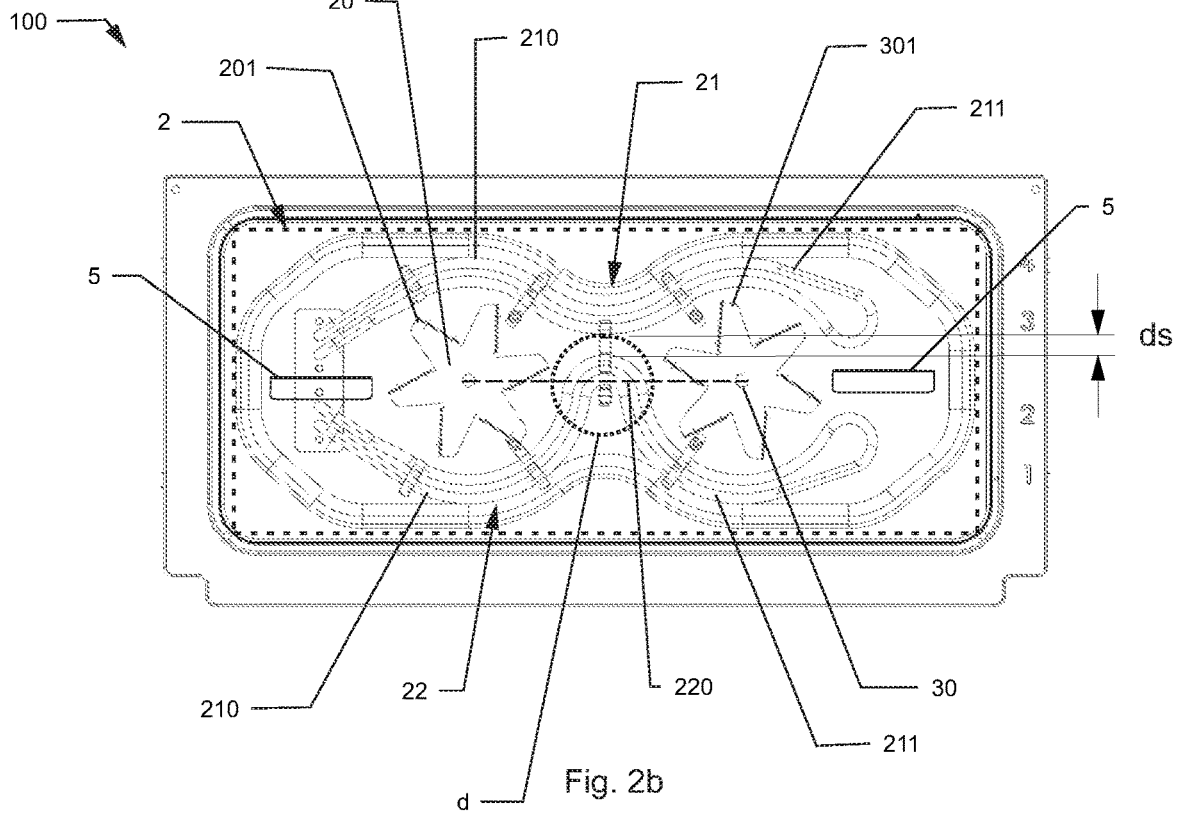

FIG. 2b shows presently preferred embodiment to FIG. 2a. The embodiment in FIG. 2b differs from the embodiment in FIG. 2a in that the curved section d of the lower heating element, which is the second heating element 22 in this embodiment, is curved such that it crosses a plane 220 defined by the rotation axes of the first fan and the second fan (i.e. both rotational axes lie in said plane 220).

Figures 3, 4:
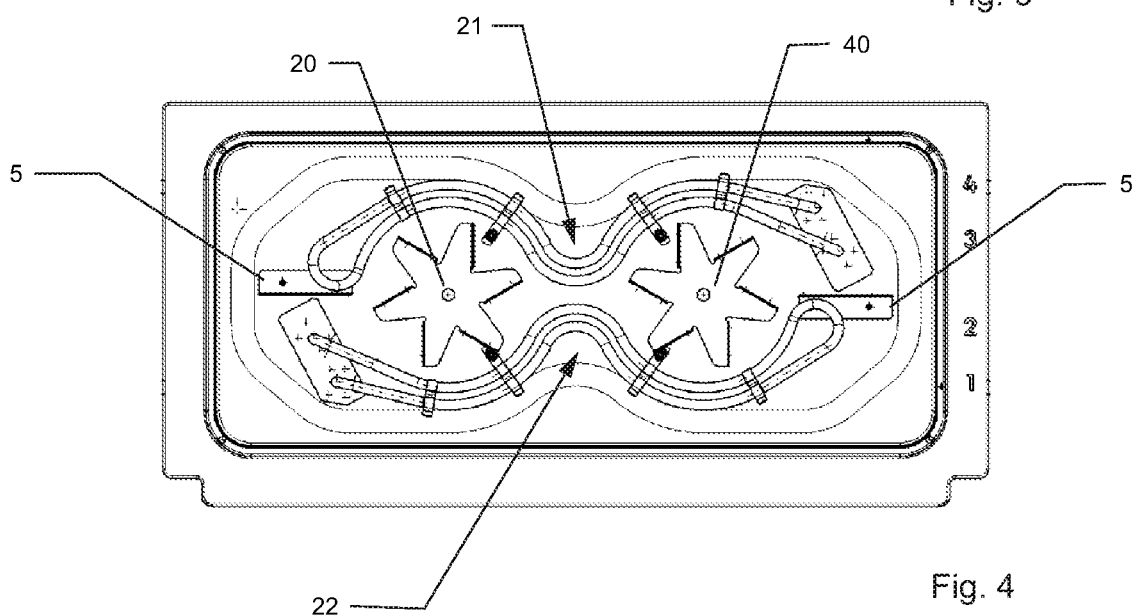
FIG. 3 shows a front view of a cooking device according to a further embodiment.
FIG. 4 shows a front view of a cooking device according to another embodiment.

FIG. 3 shows another advantageous embodiment where the heating unit comprises a first and a second subsection 2a, 2b. The first subsection 2a comprises the first and second heating elements 21, 22 and the first fan 20. The second heating subsection 2b comprises a third 41 and a fourth 42 heating element capable to operate at different average surface temperatures and a second fan 40. Second fan 40 is advantageously a radial fan, too.

The cooking device 100 may be configured in such a manner that, in at least one mode of operation, the second fan 40 collects air from the cooking cavity 1 and conveys a third airflow towards the third heating element 41 and a fourth airflow towards the fourth heating element 42. The third airflow passing the third heating element 32 creates a third airflow circuit and the fourth airflow passing the fourth heating element 42 creates a fourth airflow circuit. The third airflow enters the cooking cavity in its first part 12 and the fourth airflow enters the cooking cavity in its second part 13.

Again, in an advantageous mode of operation, the rotation direction and/or rotating speed of the first fan 20 can be opposite to or different from the rotation direction and/or rotating speed of the second fan 40.

In another advantageous mode of operation, a rotation direction and/or rotating speed of the first fan 20 can have the same direction and/or speed as the second fan 40.

The first fan 20 and the second fan 40 each comprise blades that extend from the rotational axis A of the respective fan 20, 40 in radial direction and end in tips 201, 401 of the respective fan 20, 40.

Again, the first 21, second 22, third 41 and fourth 42 heating element each may have the shape of a folded heating rod. Each respective folded rod has a parallel section "a" where a first section of the rod is parallel to a second section of the rod. Each heating element 41, 42 has a folding section "b" which refers to the bent portion of the rod between the first and the second section. Furthermore, a connector section "c" of each of the respective rods is formed by the two portions at the start and at the end of the rod, which are mounted close to each other. The connector section of the first 21, the second 22, the third 41, and the fourth 42 heating element are controllable independently from each other.

The first 21 and the second 22 heating element each comprise a curved portion 210 that extends essentially along a sector section of a rotation circle described by the tips 201 of blades of the fan 20.

The third 41 and the fourth 42 heating element each comprise a curved portion 410 that extends essentially along a sector section of a rotation circle described by the tips 401 of blades of the fan 40.

The curved portion 201 of each of the heating elements 21, 22, 41, 42 extends essentially along a sector section of more than 60°.

A first deflector element 5 is arranged between the connector section c of the first heating element 21 and the connector section c of the second heating element 22. A second deflector element 5 is arranged between the connector section c of the third heating element 41 and the connector section c of the fourth heating element 42.

In an advantageous operation of the cooking device, the temperature difference between the first airflow and the second airflow, as they enter the cooking cavity 1, is again at least 20° C., advantageously at least 50° C., very advantageously at least 100° C. The temperature difference between the third airflow and the fourth airflow, as they enter the cooking cavity 1, is at least 20° C., advantageously at least 50° C., very advantageously at least 100° C.

The cooking device 100 might advantageously be a steam oven, wherein in the intended operation, the humidity of the air is at least 40%.

FIG. 4 shows another advantageous embodiment of the device, again with a first fan 20 and a second fan 40. The first heating element 21 extends above the two fans 20, 40 and the second heating element 22 extends below the two fans 20, 40.

The fans 20, 40 are advantageously rotating in opposing directions.

The first and second heating elements may be symmetric to each other, which allows to use the same type of heating rod for both of them.

The first and second heating elements may be curved and shaped as those if the embodiment of FIG. 2a.

Advantageously, the connector section of the first heating element 21 is adjacent to the folding section of the second heating element 22 and the folding section of the first heating element 21 is adjacent to the connector section of the second heating element 22.

Notes

Figure 5:
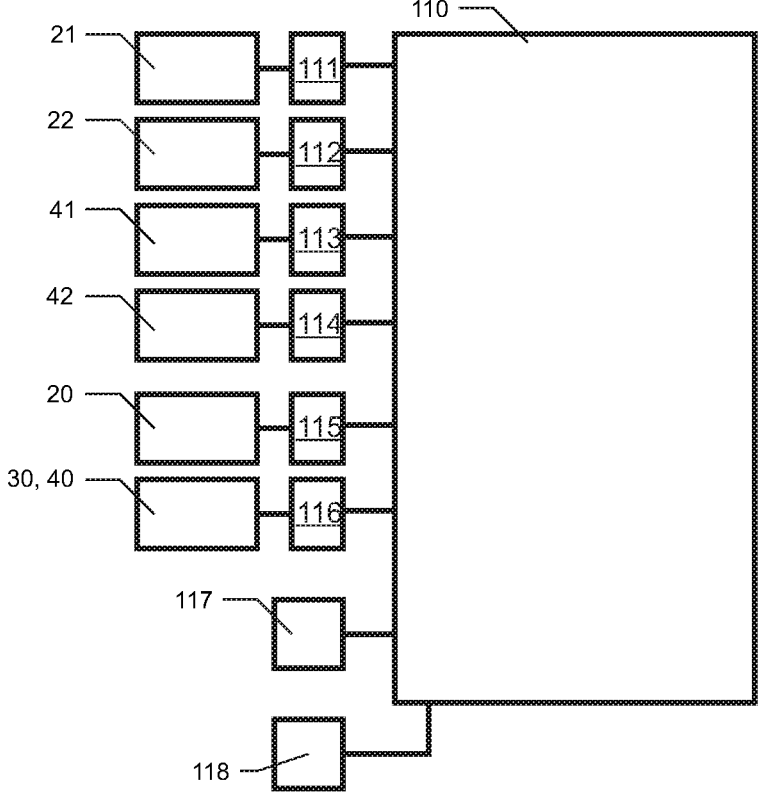
FIG. 5 shows a schematic diagram of some of the components of an embodiment of the device.

FIG. 5 shows a block diagram of some components of a cooking device 100.

In particular, and in all embodiments, the cooking device comprises a control unit 110, which may e.g. be a microprocessor system including memory and program instructions. It may be implemented as a single unit or comprise several subunits. Control unit 110 is adapted to control the components of the device and to carry out the steps for operating it automatically.

The device may further comprise a series of power drivers 111-114, advantageously with at least one power driver for each heating element, with each power driver 111-114 powering one heating element. The control unit may be adapted to control the power drivers independently and individually in order to power the heating elements 21, 22, 41, 42 independently and individually at different, and advantageously differently varying, power levels. For example, the power drivers 111-114 may comprise relays for switching the heating elements on or off at short cycles (e.g. a few ten seconds) in order to control their average heating power. Alternatively, semiconductor switches may be used.

The device may further comprise at least one fan driver 115, 116 for operating the fan(s) 20, 30, 40 of the heating unit. Again, there may be one fan driver 115, 116 per fan, and the control unit 110 may be adapted to control the fan drivers 115, 116 and therefore the fans independently and individually.

As shown in in FIG. 5, the device may further comprise at least one temperature sensor 117 for measuring a temperature within cooking cavity 1 and/or heating cavity 25. In this case, control unit 110 may be adapted to control the temperature measured by the temperature sensor 117 in a closed loop, adapting it to a desired temperature.

Advantageously, there is only one such temperature sensor 117, which may e.g. be arranged in heating cavity 1 (i.e. it is located to measure a signal indicative of the temperature in heating cavity 1) in order to measure (and regulate in a closed loop) the temperature at a given point in heating cavity 1. In this case, and in at least one mode of operation, control unit 110 may be adapted to maintain different temperatures in the first and second part 12 and 13 of the cooking cavity 1 by keeping the temperatures of the first and second heating elements 21, 22 (and, where available, of the third and fourth heating elements 41, 42) at different average surface temperatures. Advantageously, these average temperatures differ by at least 20° C., in particular by at least 50° C.

In one embodiment, temperature sensor 117 may comprise two redundant temperature measuring units for safety reasons. These two measuring units are, however, located to measure the temperature at substantially the same position of cooking cavity 1 and are therefore considered to be a single temperature sensor.

If the device is a steam oven, it may further comprise a steam generator 118 as it is known to the skilled person. Control unit 110 may be adapted to cause the steam generator 118 to generate steam to be fed to the cooking cavity 1.

As shown in the embodiments of FIGS. 2a, 3, and 4, if there are a first and a second fan 20, 40, there are advantageously at least two deflector elements 5, with the two fans 20, 40 being arranged between them. The deflector elements 5 interrupt the vertical air flows to the left and right of the two fans 20, 40.

The two fans are advantageously rotating in opposite directions. In this case, there may advantageously be no deflector element between the two fans 20, 40.

Further, if there are at least two fans 20, 40, the axes of the two fans are advantageously arranged horizontally, and the fans are arranged horizontally side by side as shown in all the embodiments having two fans.

The mode where the two heating elements 21, 22 (and 41, 42, where available) are operated at different average surface temperatures may be only one of several operating modes. In another operating mode, the control unit may be adapted to operate the two heating elements 21, 22 (and 41, 42, where available) at the same average surface temperatures in order to generate a homogeneous temperature distribution within the cooking cavity 1.

Even though only shown in FIGS. 1d and 1e, advantageously all embodiments comprise a heating cavity 25 separated by a wall 26 from the cooking cavity 1.

In the example of FIG. 1d, there are several entry openings 27, but there may be only a single entry opening, which may be protected by a grid.

Similarly, while FIG. 1d only shows one first and one second exit opening 28a, 28b, there may be several first exit openings 28a and/or several second exit openings 28b.

While there are shown and described presently preferred embodiments of the invention, it is to be distinctly understood that the invention is not limited thereto but may be otherwise variously embodied and practiced within the scope of the following claims.

What is claimed is:

1. A cooking device comprising:
   a cooking cavity,
   a heating cavity,
   a wall arranged between the cooking cavity and the heating cavity,
   ventilation openings located between the cooking cavity and the heating cavity,
   a heating unit arranged in the heating cavity and comprising a first and a second heating element and a first fan, wherein the first fan is positioned and adapted to collect air from the cooking cavity and to generate
      a first airflow interacting with the first heating element and being conveyed back into a first part of the cooking cavity, and
      a second airflow interacting with the second heating element and being conveyed back into a second part of the cooking cavity,
   a control unit adapted to operate the first and second heating elements independently from each other,
   wherein the heating unit comprises a second fan, and wherein the second fan is positioned and adapted to collect air from the cooking cavity and to convey said air towards the first and the second heating element,
   wherein at least one of the heating elements comprises at least one curved portion that extends essentially along a sector section of a rotation circle described by tips of blades of the first fan,
   wherein at least one of the heating elements comprises at least a second curved portion that extends essentially along a second sector section of a rotation circle described by tips of blades of the second fan.

2. The cooking device of claim 1, wherein in an intended operation, a rotation direction of the first fan is opposite to a rotation direction of the second fan.

3. The cooking device of claim 1, wherein at least one of the heating elements is shaped as a folded heating rod comprising
   a parallel section where a first section of the rod extends parallel to a second section of the rod,
   a bent folding section connecting the first and the second section of the rod, and a connector section forming a beginning and an end of the rod.

4. The cooking device of claim 3 comprising at least one deflector element arranged in said heating cavity, wherein said deflector element is arranged between two of the heating elements and extends transversally to a tangential direction of the first fan.

5. The cooking device of claim 1 having at least two deflector elements with the first and second fan being between the two deflector elements.

6. The cooking device of claim 3 with at least one deflector element being arranged between the connector section of the first heating element and the connector section of the second heating element, and/or between the connector section of the first heating element and the folding section of the second heating element, and/or between the folding section of the first heating element and the folding section of the second heating element.

7. The cooking device of claim 1, wherein the control unit is adapted to keep a temperature difference between the first airflow and the second airflow exiting the heating cavity at at least 20° C.

8. The cooking device of claim 1, wherein said cooking device comprises a steam generator and said control unit is adapted to maintain an air humidity in said cooking cavity at at least 40%.

9. The cooking device of claim 1, wherein said ventilation openings comprise at least one entry opening, at least a first exit opening and at least a second exit opening, wherein said first fan is adapted to convey air from said cooking cavity into said heating cavity through said entry opening, and to convey said first airflow from said heating cavity into said cooking cavity through said first exit opening and said second airflow from said heating cavity into said cooking cavity through said second exit opening.

10. The cooking device of claim 9 wherein said at least one first exit opening is located in an upper half of the cooking cavity and wherein said at least one second exit opening is located in a lower half of the cooking cavity.

11. The cooking device of claim 1 further comprising a single temperature sensor arranged in the cooking cavity, wherein said control unit is adapted to maintain, in a closed loop, the temperature at the temperature sensor at a desired temperature while keeping the surface temperatures of the first and second heating elements at different average surface temperatures.

12. The cooking device of claim 1, wherein the at least one curved portion extends along the sector section having an angle of above 60°.

13. The cooking device of claim 4 having at least two deflector elements with the first and second fan being between the two deflector elements.

14. The cooking device of claim 4 with at least one deflector element being arranged between the connector section of the first heating element and the connector section of the second heating element, and/or between the connector section of the first heating element and the folding section of the second heating element, and/or between the folding section of the first heating element and the folding section of the second heating element.

15. The cooking device of claim 7, wherein the control unit is adapted to keep the temperature difference between the first airflow and the second airflow exiting the heating cavity at at least 50° C.

16. The cooking device of claim 15, wherein the control unit is adapted to keep the temperature difference between the first airflow and the second airflow exiting the heating cavity at at least 100° C.

17. The cooking device of claim 10 wherein said at least one first exit opening is located in an uppermost third of the cooking cavity and wherein said at least one second exit opening is located in a lowermost third of the cooking cavity.

18. The cooking device of claim 1 wherein the cooking device is a steam oven.

19. The cooking device of claim 1 wherein the control unit is adapted to operate the first and second heating elements at different average surface temperatures.

20. The cooking device of claim 1, wherein the at least one curved portion extends along the sector section having an angle of above 120°.

* * * * *